(12) United States Patent
Muller

(10) Patent No.: US 7,550,206 B2
(45) Date of Patent: Jun. 23, 2009

(54) PHOSPHONIC ACID-MODIFIED MICROGEL DISPERSION

(75) Inventor: Horst Muller, Cologne (DE)

(73) Assignee: Bollig & Kemper GmbH & Co. KG, Cologne (DE)

( * ) Notice: Subject to any disclaimer, the term of this patent is extended or adjusted under 35 U.S.C. 154(b) by 325 days.

(21) Appl. No.: 10/531,200

(22) PCT Filed: Oct. 13, 2003

(86) PCT No.: PCT/DE03/03419

§ 371 (c)(1),
(2), (4) Date: Dec. 30, 2005

(87) PCT Pub. No.: WO2004/035642

PCT Pub. Date: Apr. 29, 2004

(65) Prior Publication Data

US 2006/0128887 A1    Jun. 15, 2006

(30) Foreign Application Priority Data

Oct. 14, 2002 (DE) ............................. 102 47 847
Aug. 8, 2003 (DE) ............................. 103 36 770

(51) Int. Cl.
C09D 133/00    (2006.01)
C09D 161/20    (2006.01)

(52) U.S. Cl. ................. 428/522; 428/524; 524/504; 524/512; 524/710; 525/158; 525/160; 526/277; 526/278

(58) Field of Classification Search ............ None
See application file for complete search history.

(56) References Cited

U.S. PATENT DOCUMENTS 2,908,659 A    10/1959  Shashoua ................ 260/32.6
4,055,607 A    10/1977  Sullivan et al. ............ 260/851
4,245,036 A     1/1981  De Winter et al. .......... 430/510
5,955,532 A *   9/1999  Chang et al. ............. 524/504
2006/0211813 A1*  9/2006  Mueller ................ 524/556

FOREIGN PATENT DOCUMENTS

| DE | 39 15 787 C1 | 5/1990 |
|---|---|---|
| DE | 42 07 653 A1 | 9/1993 |
| DE | 195 04 015 A1 | 8/1996 |
| DE | 40 09 858 C2 | 2/1998 |
| DE | 199 49 592 A1 | 4/2001 |
| DE | 199 59 923 A1 | 6/2001 |
| EP | 0 117 174 A1 | 8/1984 |
| EP | 0 502 934 B1 | 2/1994 |
| EP | 1 156 089 A1 | 11/2001 |
| EP | 1 203 786 A1 | 5/2002 |
| EP | 1 295 922 A2 | 3/2003 |
| GB | 846471 | 8/1960 |
| GB | 1 493 744 | 11/1977 |
| WO | WO 96/24619 | 8/1996 |
| WO | WO 00/63265 | 10/2000 |
| WO | WO 00/63266 | 10/2000 |
| WO | WO-01/93820 | * 12/2001 |

OTHER PUBLICATIONS

CAPLUS—Abstract 1989: 596885 for JP 63162704.
CAPSUL—Abstract 1992: 196342 for JP 03275780.

* cited by examiner

*Primary Examiner*—David Buttner
(74) *Attorney, Agent, or Firm*—Occhiuti Rohlicek & Tsao LLP

(57) ABSTRACT

Emulgator-free microgel, dispersed in an aqueous phase, obtainable by producing a polyacrylate (A) in the presence of at least one compound (B) containing a phosphonic acid group, where the polyacrylate (A) has at least one hydroxyl group and at least one carboxyl group; aqueous phase crosslinking of the reaction mixture originating from step a) with an aminoplast resin (C); subsequent emulsion polymerization of the reaction mixture originating from step b) with at least one monomer compound (D) which contains at least one radically polymerizable double bond.

15 Claims, No Drawings

PHOSPHONIC ACID-MODIFIED MICROGEL DISPERSION

CROSS-REFERENCE TO RELATED APPLICATIONS

This application is the National Stage of International Application No. PCT/DE2003/003419, filed Oct. 13, 2003, which claims the benefit of German Patent Applications Ser. No. 10247847.3, filed on Oct. 14, 2002 and Ser. No. 10336770.5 filed on Aug. 8, 2003. The contents of both applications are hereby incorporated by reference in their entirety.

The present invention relates to a microgel and its use in a multilayer coating, in particular in the production painting of automobile bodies.

BACKGROUND OF THE INVENTION

A multilayer coating totaling four different layers (four-stage system) is generally used for the production painting of automobile bodies; these four layers are applied in succession at separate paint stations:

The first layer located directly on the vehicle sheet metal is an electrophoretically applied layer (electrocoat, cathodic dip coating layer) which is applied by electro dip coating—mainly cathodic dip coating—for corrosion protection and subsequently baked.

The second layer, on top of the electro coat, is a primer-surfacer about 30 to 40 µm thick which on the one hand offers protection against mechanical attack (stone chip protection) and on the other hand ensures adequate topcoat holdout, i.e. it smoothes the rough surface of the body for the following topcoat and fills minor irregularities. The paints used to produce this primer-surfacer coat contain pigments as well as binders. The wettability of the pigments used has an effect on the topcoat holdout of the entire multilayer coating and on the gloss of the primer-surfacer, as demanded by some automobile manufacturers. Application of the primer-surfacer coat is generally carried out through application with electrostatic high-speed rotary bells and subsequent baking at temperatures above 130° C.

The third layer, on top of the primer-surfacer, is the basecoat, which gives the desired color to the body through the corresponding pigments. The basecoat is applied in a conventional spraying method. The film thickness of this traditional basecoat is between about 12 and 25 µm, depending on the hue. This coat, particularly with metallic effect paints, is mostly applied in two steps. In a first step the paint is applied by means of electrostatic high-speed rotary bells, followed by a second application by means of pneumatic atomization. This coat (when using water-based basecoat) is interim dried using infra-red heaters and/or warm air convection.

The fourth and topmost layer, on top of the basecoat, is the clearcoat, which is usually deposited in one application by electrostatic high-speed rotary bells. It gives the body the desired gloss and protects the basecoat from the effects of the environment (UV radiation, salt water, etc.).

Finally, the basecoat and the clearcoat are baked together.

Additional basic requirements besides its color-imparting properties are placed on a waterborne basecoat which can be used in this multilayer coating, or in a basecoat produced from it:

For one, the basecoat in its cured state must result in an optimal orientation of the aluminum flakes used as effect pigments. This property, known by the term "flop effect", is of crucial importance for any metallic finish. A particularly good "flop effect" is achieved when the tiny platelet-shaped effect pigments are aligned as evenly as possible at a shallow angle to the paint layer.

In addition, the basecoat layer must have a precisely specified adhesion to the paint layers below and above it. The basecoat decisively affects the stone chip resistance of the originating multilayer coating of production automobile bodies. It should be noted in this connection that stone chip resistance is known as a "k.o. criterion," i.e. only those multilayer coatings which have previously passed the VDA stone chip test can be used in production operations. The final multilayer coating passes the test if, under a precisely defined mechanical load, it exhibits pitting which does not exceed a certain area and is attributable to a separation of the basecoat from the primer-surfacer coat underneath it. Consequently, the adhesion of the basecoat must be adjusted in such a way that it is high enough so that the clearcoat does not separate from it, but is low enough not to pull the primer-surfacer with it when chipped by a stone, which would otherwise result in considerable corrosion damage to the automobile body.

Secondly, the basecoat must have good workability. This means that, if possible, a high enough film build can be achieved in one pass so that adequate hiding is ensured. If only 17 µm thickness is required in the basecoat for black, a color which hides well, it is at least 45 µm for white, a color which does not hide well. Applying a film thickness like this in one pass is still a considerable problem since the waterborne basecoat must possess the appropriate rheological properties.

In the case of basecoats with metallic effect pigments, the previously described problem, i.e. ensuring adequate stability with a typical film build of about 18 µm, is particularly prominent. Silver metallic is a particularly critical color in this respect.

The term "rheological properties" is understood to signify that, on the one hand, the paint has such a low viscosity in the spraying process, i.e. at high shear rates, that it can be atomized easily and, on the other hand, when it strikes the substrate, i.e. at low shear rates, it has such a high viscosity that it is sufficiently stable and does not create sags. The higher the layer thickness is to be, the greater the problem of combining these contradictory properties. The creation of a definite metallic effect is associated with these properties.

This basic problem is probably also the reason why a large number of publications are concerned with specially formulated binder systems or with special additives for waterborne basecoats.

Special additives are described (EP-0 281 936) to improve rheological properties and to create a better metallic effect. These are special coating silicates which contain substantial quantities of alkali or alkaline earth ions. These ions often lead to poor condensation water resistance in the total system of an automobile coating because of their hygroscopic effect.

So the paint manufacturers take pains to avoid such additives if possible and to use those polymers as binders which naturally incorporate the desired properties, the so-called "tailor-made" polymers.

Among the most important representatives of this type are crosslinked polymer microparticles present in an aqueous dispersion, called "microgels" for short.

The addition of microgels not only brings about an improvement in rheological properties but also has a considerable effect on the stability of the paint to be applied, the alignment of the effect pigments and the adhesion of the basecoat to the primer-surfacer below it. Thus the addition of microgels has a decisive effect on the stop chip resistance of the multilayer coating. However, it must be pointed out that not all the aforementioned properties are influenced positively by the addition of microgels:

Special microgels are known from EP 0 030 439 B1 and EP 0 242 235 A1. The aqueous microgel dispersions described there as beneficial for metallic finishes as well are not completely crosslinked microgels but belong to the so-called "core/shell" microgels.

The term "core/shell structure" is understood to signify that the polymer particle is built up essentially of two different zones: the inner zone (core) is surrounded by an outer zone (shell), where these zones have a different chemical composition and as a result different physical properties as well.

The core of this microgel can be obtained from a mixture which contains difunctional monomers in addition to monofunctional monomers. The crosslinking takes place through the use of an emulgator. This crosslinked microparticle in accordance with EP 0 030 439 B1 is subsequently coated with a layer of non-crosslinked acrylic polymers and grafted. According to EP 0 242 235 A1, the crosslinked microparticle is coated with a layer of polymerizable aromatic compounds.

It is further described in EP 0 030 439 A1 to react the microgels present in an aqueous dispersion into a non-aqueous phase and to use them for solvent-containing coating compositions.

From EP 0 038 127 B1, EP 0 029 637 A1 and GB 2 159 161 A microgels are known which are obtained through polymerization of suitable monomers in the presence of an emulgator, for example N,N-bis(hydroxyethyl)taurine.

The term "emulgator" is understood to signify those compounds which have both a hydrophilic and a hydrophobic residue. Emulgators bring about a stabilization of emulsions, i.e. of dispersed systems of two non-miscible or only partially miscible fluids or phases, one of which is finely dispersed in the other. A broader definition of such compounds is given, for example in Römpp's *Encylopedia of Chemistry* (vol. 2, $8^{th}$ edition, 1981, pp. 1126-1127). Generally a distinction is made between ionic, non-ionic and amphoteric emulgators. For color-imparting coating compositions, emulgators are used which have a group originating from sulfonic acid as the hydrophilic residue and a longer-chain fatty alkyl residue as the hydrophobic residue.

A serious drawback to the microgels produced with the use of an emulgator is that the emulgator remains in the finished microgel; the latter can be used only with considerable disadvantages for a large number of applications, for example because of the sulfur-containing groups (sulphonic acid groups) present in the emulgator. Because of the emulgator these microgels contain, they have disadvantageous properties, for example with respect to their use in waterborne basecoats in the automobile industry, specifically with regard to storage in water and condensation water resistance.

EP-0 502 934 also describes a microgel dispersion. It is used both to improve rheological properties and to increase the gassing stability of aqueous metallic basecoats. These microgel dispersions are produced through single-stage aqueous phase polycondensation of a polyester polyol with an amino plastic resin (melamine resin).

The use of this microgel in basecoats in the painting of automobile bodies has the disadvantage that the adhesion between the basecoat and a clearcoat applied over it consisting of a powder clear coat or a powder clearcoat slurry does not meet the requirements specified by the automobile industry.

Microgels are further known from DE 195 04 015 A1 which are produced by polymerizing an ethylenically monofunctional compound (polyacrylate) with at least one ethylenically di- or multi-functional compound in the presence of a polyester. The polyester functions as emulgator and stabilizer.

These microgels have the disadvantage that the rheological properties of these paints no longer meet the increased requirements of the automobile industry. This is shown particularly clearly with respect to the requirements for viscosity on the one hand and stability on the other.

So it is not possible, using these microgels, to prepare an aqueous basecoat which has a maximum viscosity of 120 mPa·s at a shear rate of 1,000 $s^{-1}$ and is so stable that the necessary coating thicknesses of 20-30 μm (depending on the particular color also less or more) can be attained without sagging.

Furthermore, microgels are known in WO 00/63265 and WO 00/63266 which can be obtained from a multi-stage polymerization process, in which polymerization of ethylenically monofunctional compounds with ethylenically di- or multi-functional compounds is carried out in a first step in the presence of a polyester polyol, polyurethane and/or polyacrylate. As a final step, the product obtained in this way is reacted with a cross-linker. However, there has been shown to be a risk of gelling in the reaction of trimellithic acid or its anhydride with the poly(meth)acrylate.

A further problem in the use of these subsequently crosslinked microgels is that waterborne basecoats containing these microgels do not demonstrate sufficient adhesion on plastic substrates to be applied directly to a plastic surface, an automobile bumper for example, without an intermediate or adhesion primer coat.

SUMMARY OF THE INVENTION

The object of the present invention is to prepare a waterborne microgel which can be used in waterborne basecoats, specifically for the automobile industry, where the water-based basecoat shall demonstrate an overall improved property level compared with water-based basecoats from the prior art. In accordance with a first instance in the sense of the present object, the multilayer coating obtainable therefrom shall overcome the previously described drawbacks of the prior art, in particular the color coat shall have adequate adhesion on plastic substrates and the overall property level of the final multilayer coating shall satisfy the strict requirements of the automobile manufacturers (particularly with respect to appearance and stone chip resistance).

In accordance with a second improvement of the overall property level in the sense of the present object, the color coat shall be sufficiently insensitive to clouding and the overall property level of the final multilayer coating shall satisfy the strict requirements of the automobile manufacturers (particularly with respect to appearance and stone chip resistance).

Beyond that, this microgel shall be compatible in particular with polyurethane- and polyacrylate-based binder systems and result in particularly high-quality coatings.

The first improvement in the sense of the object is achieved in accordance with the invention by a emulgator-free microgel dispersed in an aqueous phase, obtainable by:
a) producing a polyacrylate (A) in the presence of at least one compound (B) containing a phosphonic acid group, where the polyacrylate (A) has at least one hydroxyl group and at least one carboxyl group;
b) crosslinking in an aqueous phase of the reaction mixture originating from step a) with an aminoplast resin (C);
c) subsequent emulsion polymerization of the reaction mixture originating from b) with at least one monomer compound (D) which contains at least one radically polymerizable double bond.

An emulgator-free microgel of this kind occurring in dispersion is present in a core/shell structure. The inner zone is completely crosslinked in accordance with the definition given previously. The outer zone of this core/shell microgel is not crosslinked. Crosslinking of the outer shell when using a monomer compound with at least one radically polymerizable double bond does not take place until baking conditions exist for the production of corresponding multilayer coating.

Partial crosslinking in the finished paint through the outer shell is only ensured if a monomer compound (D) containing hydroxyl groups is used with at least one radically polymerizable double bond.

Furthermore, a coating composition containing this emulgator-free microgel dispersion demonstrates such outstanding adhesion that it can be used even in multilayer coating considered critical in the production painting of automobiles, specifically in conjunction with powder clearcoats.

If a compound without a hydroxyl group is selected as the monomer (D), the microgel obtainable in this way is crosslinked in its core, but the shell is not crosslinked and cannot be crosslinked in the paint.

Surprisingly, the use of a monomer compound (D) without hydroxyl groups reinforces this positive adhesion property.

In accordance with this embodiment, it is ensured that the emulsion polymeride cannot participate in the crosslinking during film formation. Outstanding adhesion on plastic substrates is achieved thereby. Outstanding adhesion is likewise achieved in conjunction with powder paints.

Through the presence of the phosphonic acid group during reaction step a) it is ensured that the mixture obtainable from step a) reacts in an aqueous phase with the aminoplast resin (C) in step b) to a microgel dispersion, i.e. that crosslinked particles are formed without degrading the stability of the dispersion. Coagulation of the dispersion is effectively avoided. In contrast to the known processes of the prior art, no trimellitic acid or its anhydride is used in all the embodiments in accordance with the invention. These compounds have the decided disadvantage that they considerably increase the risk of gelling during reaction with a poly(meth)acrylate.

The reaction to the microgel in accordance with the invention is possible independently of a normal pH value for waterborne coating compositions of the reaction mixture. Crosslinking independently of the degree of neutralization is thus ensured: even with a 100% degree of neutralization, crosslinking takes place, including with a melamine resin that is sluggish to react at low baking temperatures (i.e. of less than 100° C.), such as hexamethoxymethyl-melamine.

In contrast, the degree of neutralization in the production of microgel dispersions of the prior art has a considerable effect on the crosslinking reaction: with an increasing degree of neutralization, crosslinking is reduced if not actually prevented.

As a result of the special production method for the inventive microgel, it is furthermore possible to select the required solvents in the production of the polyacrylate (A) or (E) in such a way that they can remain in the application-ready coating composition. The complicated removal of the solvents required for polymerization is dispensed with completely. Butyl glycol is particularly preferred as a solvent in this connection.

The degree of crosslinking of the microgels can be identified by the insoluble ingredients content. The insoluble ingredients are determined by the so-called "THF method." For this, about 1 g of the microgel dispersion is weighed into a centrifuge tube, 10 ml of tetrahydrofuran is added and it is homogenized for about 1 minute in an ultrasound bath. Then it is centrifuged at 13,500 rpm for 15 minutes using a centrifuge with a fixed-angle rotor. The excess is subsequently carefully decanted and the tube is dried in a laboratory oven for 6 hours at 105° C. After the tube has cooled, the residue is reweighed. The insoluble ingredients are calculated using the formula below:

$$\% \text{ insoluble ingredients} = \frac{\text{residue} * 10000}{\text{weighed quantity} * \% \text{ solid content of the microgel dispersion}}$$

The term "crosslinked for the most part" refers to those microgels which, relative to the crosslinked part, have a ratio of non-crosslinked polymers of not more than 50% by weight. With respect to the core/shell microgel in accordance with the invention, this means that the crosslinked core is described as "crosslinked for the most part" if it contains not more than 50% by weight of non-crosslinked components.

The emulgator-free and phosphonic acid-modified microgel under the invention occurs in an aqueous dispersion, lends increased structural viscosity to compositions which contain this microgel dispersion so that adequate stability is ensured during application, where the originating coating compositions can be cured both chemically and physically.

In the scope of the present invention, the property "aqueous" means that the dispersions under the invention contain no or only minor amounts of organic solvents. Minor amounts are those amounts which do not destroy the aqueous nature of the dispersions under the invention.

The property "structurally viscous" means that coating compositions which contain this emulgator-free microgel dispersion have a viscosity at higher shear stress or a higher shear rate gradient which is lower than at smaller values (c.f. Römpp's *Encyclopedia of Paints & Printing Inks*, Georg Thieme Verlag, Stuttgart, N.Y., 1998, page 546, "Structural viscosity").

This structural viscosity is time-independent. This time-independence means that the viscosity curve, depending on shear rate, is identical with both increasing shear rate and with decreasing shear rate. This structural viscosity behavior takes account of the needs of the spraying application on the one hand and of the requirements concerning storage and settling stability on the other: In a moving state, for example when a coating composition which contains the microgels under the invention is being pumped around the circulation line of the paint facility and when being sprayed, the coating composition assumes a low viscosity state which ensures good sprayability. Without any shear stress, viscosity increases and in this way ensures that the coating composition already on the substrate surface exhibits a reduced tendency to run on vertical surfaces ("curtaining"). In the same way, the higher viscosity in an immobile state, such as during storage, largely prevents settling of any solid components present, such as pigments, or ensures that the solid components which have not settled much during storage can be remixed.

Within the scope of the present invention, the term "physical curing" means the curing of one layer from a coating material by film formation as the result of the release of solvents from the coating material, where the linking within the coating takes place through chaining of the polymer molecule film-forming components or of the binders (for this term see Römpp's *Encyclopedia of Paints & Printing Inks*, Georg Thieme Verlag, Stuttgart, N.Y., 1998, "Binders" pages 73 and 74). Or the film formation takes place through the coalescence of binder particles (for this term see Römpp's *Encyclopedia of Paints & Printing Inks*, Georg Thieme Verlag, Stuttgart, N.Y., 1998, "Curing" pages 274 and 275). Crosslinking agents are not normally necessary for this. If necessary, the physical curing can be promoted by heat or by the effects of actinic radiation.

In contrast, the term "chemical curing" means the curing of one layer of a coating material through a chemical reaction (see "Curing of Plastics" in Römpp's *Encyclopedia of Chemistry*, $8^{th}$ edition, 1983, pp. 1602 f).

Chemical curing is normally achieved by atmospheric oxygen or by crosslinking agents.

The second improvement in the sense of the object of the present invention is achieved under the invention by an emulgator-free microgel dispersed in an aqueous phase obtainable by a) producing a polyacrylate (A) in the presence of at least one compound (B) having a phosphonic acid group, where the polyacrylate (A) has at least one hydroxyl group and at least one carboxyl group;
b) crosslinking in the aqueous phase of the reaction mixture with an aminoplast resin (C) from step a);

where the reaction mixture from step b) does not undergo subsequent emulsion polymerization.

The polyacrylate (A) originating from step a) can undergo emulsion polymerization with at least one monomer compound (D) before step b), where monomer compound (D) contains at least one radically polymerizable double bond.

A coating composition containing this emulgator-free microgel dispersion demonstrates such outstanding adhesion that it can also be used in multilayer coatings considered critical in the production painting of automobiles, particularly in conjunction with powder clear coats.

In accordance with a preferred embodiment of the present invention, the polyacrylate (A) is obtainable by polymerization of a monomer (i) with at least one polymerizable double bond and at least one hydroxyl group;
of a monomer (ii) with at least one polymerizable double bond and at least one carboxyl group; and
of a monomer (iii) without hydroxyl groups and without a carboxyl group with at least one polymerizable double bond.

As a result of the volume of monomers containing a hydroxyl group, the crosslinking process can be stopped here. With a small volume of monomers containing hydroxyl groups, the crosslinking points are far apart, depending on the molecular weight of the polymers. If the volume of monomers containing hydroxyl groups is increased, the crosslinking points are grouped more tightly.

This has a positive effect on the orientation of the effect pigments, the stability and also the rheology of the coating composition containing the emulgator-free microgel dispersion under the invention.

The stability of the microgel dispersion in water is positively influenced by an adequate volume of the monomer ii). However, the volume of ii) should not be selected to be too high, otherwise its resistance to condensation water is adversely affected.

In accordance with a further, also preferred embodiment of the present invention, the compound (B) is an adduct of alkylphosphonic acid with a compound containing an epoxide group.

Octylphosphonic acid can be named as an example of an alkylphosphonic acid. Adducts of glycidyl esters of a monocarbon acid branched in α-position with 5 to 18 carbon atoms per molecule with phosphonic acid can be named as an example of compounds containing epoxide groups. A particularly preferred glycidyl ester is marketed under the trade name Cardura® E10 by the Resolution Company.

The choice of these initial compounds ensures pH value independence during crosslinking in a specially effective way.

The first improvement in the sense of the object of the present invention is also achieved by an emulgator-free microgel dispersed in an aqueous phase obtainable by a) producing a polyacrylate (E) by copolymerization
of a monomer (i) with at least one polymerizable double bond and at least one hydroxyl group;
of a monomer (ii) with at least one polymerizable double bond and at least one carboxyl group; and
of a monomer (iv) with at least one polymerizable double bond and at least one phosphonic acid group;
b) aqueous phase crosslinking of the reaction mixture originating from step a) with an aminoplast resin (C);
c) subsequent emulsion polymerization of the reaction mixture originating from step b) with at least one monomer compound (D) which contains at least one radically polymerizable double bond.

Also in accordance with this embodiment, the emulgator-free and phosphonic acid-modified microgel under the invention is present in an aqueous dispersion, it endows coating compositions which contain this microgel dispersion with increased structural viscosity so that adequate stability is ensured during application.

The particular advantage of all emulgator-free and phosphonic acid-modified microgels under the invention in accordance with the previously described embodiment is that their addition to waterborne coating compositions brings about a clear and positive improvement in special properties.

Basically, it can be ascertained that the rheological properties of the waterborne coating compositions obtainable through the use of these emulgator-free and phosphonic acid-modified microgel dispersion are improved, compared with those of the prior art. For example, a waterborne basecoat which can be used in the automobile industry, with just the addition of 20% of the emulgator-free microgel dispersion under the invention—relative to the solids content of the coating composition—shows a viscosity of at most 100 mPa·s at a shear rate of 1,000 $s^{-1}$, where the dry film thickness of the cured basecoat measures 22 μm without any sags being observed.

The emulgator-free and phosphonic acid-modified microgel under the invention is especially suitable in the production and formulation of waterborne basecoats, in particular for those that are used in the automobile industry.

In addition, the emulgator-free and phosphonic acid-modified microgel dispersion under the invention gives the color-imparting coating composition outstanding adhesion on plastic substrates.

This property deserves special emphasis since this paint can be used in an unchanged formulation for metal, pretreated substrates (automobile bodies) as well as for plastic add-on parts for automobiles (e.g. bumpers). This prevents color deviation. Until now it has often been necessary in the area of industrial applications, starting with waterborne basecoats for the production painting of automobile bodies, to increase their adhesion on plastic substrates by the addition of specific "adhesion promoters" or even through additional adhesion coats.

The outstanding adhesion of the basecoats containing the microgel under the invention can be seen from the "steam jet test," which is the test used in the automobile industry for satisfactory adhesion.

Furthermore, through the addition of the emulgator-free and phosphonic acid-modified microgel dispersion under the invention to color-imparting coating compositions the overall property level of the final multilayer coating is not negatively affected. The final multilayer coating shows excellent properties with respect to mechanical (stone chip resistance) and visual criteria (i.e. orientation of the effect pigments).

Further it can ascertained that the emulgator-free and phosphonic acid-modified microgel dispersions under the invention have excellent workability with binder systems based on polyurethanes, polyacrylates or mixtures of polyurethanes and polyacrylates. This good workability is shown particularly from the good adhesion properties of the originating paint film on plastic substrates. Coating compositions combining polyurethane- and/or polyacrylate-based binder systems and the emulgator-free microgel dispersion under the invention produce extremely high-quality coatings.

The object of the present inventions is also achieved by an emulgator-free microgel dispersed in an aqueous phase obtainable by
a) producing a polyacrylate (E) by copolymerization
  a. of a monomer (i) with at least one polymerizable double bond and at least one hydroxyl group;
  b. of a monomer (ii) with at least one polymerizable double bond and at least one carboxyl group; and
  c. of a monomer (iv) with at least one polymerizable double bond and at least one phosphonic acid group;
b) aqueous phase crosslinking of the reaction mixture originating from step a) with an amino plastic resin (C);

where the reaction mixture originating from step b) does not undergo any subsequent emulsion polymerization.

The polyacrylate (A) originating from step a) can undergo emulsion polymerization before step b) with at least one monomer compound (D) which contains at least one radically polymerizable double bond.

Also in accordance with this embodiment, the emulgator-free and phosphonic acid-modified microgel under the invention is present in an aqueous dispersion, and endows coating compositions containing these microgel dispersions with increased structural viscosity so that adequate stability is ensured during application.

The particular advantage of all emulgator-free and phosphonic acid-modified microgels under the invention in accordance with the previously described embodiment is that their addition to water-reduced coating compositions brings about a clear and positive improvement in special properties.

Basically it can be ascertained that the rheological properties of the waterborne coating compositions obtainable through the use of these emulgator-free and phosphonic acid-modified microgel dispersion are improved, compared with those of the prior art. For example, a waterborne basecoat which can be used in the automobile industry, with just the addition of 20% of the emulgator-free microgel dispersion under the invention—relative to the solids content of the coating composition—shows a viscosity of at most 100 mPa·s at a shear rate of $1,000\ s^{-1}$, where the dry film thickness of the cured basecoat measures 22 μm without any sags being observed.

The emulgator-free and phosphonic acid-modified microgel under the invention is especially suitable in the production and formulation of waterborne basecoats, in particular for those used in the automobile industry.

Furthermore the emulgator-free and phosphonic acid-modified microgel under the invention lends the color-imparting coating composition outstanding application stability, particularly with respect to resistance to clouding.

Moreover, through the addition of the emulgator-free and phosphonic acid-modified microgel dispersion under the invention to color-imparting coating compositions the overall property level of the final multilayer coating is not negatively affected. The final multilayer coating shows excellent properties with respect to mechanical influences (stone chip resistance).

It can be further ascertained that the emulgator-free and phosphonic acid-modified microgel dispersions under the invention has excellent workability with binder systems based on polyurethanes, polyacrylates or mixtures of polyurethanes and polyacrylates. This good workability can be seen particularly from the good adhesion properties of the originating paint film on plastic substrates. Coating compositions from a combination of polyurethane- and/or polyacrylate-based binder systems and the emulgator-free microgel dispersion under the invention produce extremely high-quality coatings.

In a further, also preferred embodiment of the present invention, copolymerization is carried out in the presence of an additional monomer (iii) without a hydroxyl group and without a carboxyl group which has at least one polymerizable double bond.

As a result of the volume of monomers containing hydroxyl groups, the crosslinking process can be stopped here. With a small volume of monomers containing hydroxyl groups, the crosslinking points are far apart, depending on the molecular weight of the polymers. If the volume of monomers containing hydroxyl groups is increased, the crosslinking points are grouped more tightly.

This has a positive influence on the orientation of the effect pigments, the stability and also the rheology of the coating composition containing the emulgator-free microgel dispersion under the invention.

The monomer (i) can be selected from the hydroxyalkyl esters of acrylic acid, methacrylic acid or another α,β-olefinically unsaturated carboxylic acid which are derived from an alkylene glycol estered with the acid, or which can be obtained through reaction of the α,β-olefinically unsaturated carboxylic acid with an alkylene oxide such as ethylene oxide or propylene oxide, in particular hydroxyalkylesters of acrylic acid, methacrylic acid, ethacrylic acid, crotonic acid, maleic acid, fumaric acid or itaconic acid, in which the hydroxylalkyl group contains up to 20 carbon atoms, such as 2-hydroxyethylacrylate, 2-hydroxypropylacrylate, 3-hydroxypropylacrylate, 3-hydroxybutylacrylate, 4-hydroxybutylacrylate, 4-hydroxymethacrylate, 4-hydroxyethacrylate, 4-hydroxycrotanate, 4-hydroxymaleinate, 4-hydroxyfumarate or 4-hydroxyitaconate; or hydroxycycloalkylesters such as 1,4-bis(hydroxymethyl)cyclohexaneacrylate, octahydro-4,7-methano-1 H-inden-dimethanolacrylate or methylpropanediolmonoacrylate, methylpropanemonomethacrylate, methylpropanemonoethacrylate, methylpropanemonocrotonate, methylpropanemonomaleinate, methylpropanemonofumarate, or methylpropanemonoitaconate.

Conversion products from cyclic esters, such as ε-caprolactam, and the previously described hydroxyalkyl or cycloalkyl esters (obtainable for example under the name Tone® M 100 from DOW Chemicals) can be used.

Preferably the monomer (i) is selected from the group of hydroxyethyl(meth)acrylate, hydroxypropyl(meth)acrylate, hydroxybutyl(meth)acrylate and ε-caprolactam estered on a hydryoxy(meth)acrylate base.

The monomer (ii) can be selected from the group of acrylic acid, methacrylic acid, ethacrylic acid, crotonic acid, maleic acid, fumaric acid or itaconic acid. Preferably the monomer (ii) is selected from the group of acrylic acid and methacrylic acid.

Regarding monomer (iii) it can be

Vinylaromatic compounds, such as vinyltoluene, a-methyl styrene, p-, m- or p-methylstyrene, 2,5 dimethylstyrene, p-methoxystyrene, p-tert.-butyl styrene, p-dimethylaminostyrene, p-acetamidostyrene, and m-vinyl phenol, specifically preferred styrene;

Esters of acrylic or methacrylic acid, such as methyl(meth)acrylate, ethyl(meth)acrylate, butyl(meth)acrylate, isobutyl(meth)acrylate, ter.-butyl(meth)acrylate, isopropyl (meth)acrylate, pentyl(meth)acrylate, isoamyl(meth)acrylate, hexyl(meth)acrylate, α-ethylhexyl(meth)acrylate, furfuryl(meth)acrylate, octyl(meth)acrylate, 3,5,5-trimethylhexyl(meth)acrylate, decyl(meth)acrylate, lauryl(meth)acrylate, hexadecyl(meth)acrylate, octadecyl(meth)acrylate, stearyl(meth)acrylate and ethyltriglycol(meth)acrylate; cyclohexyl(meth)acrylate, isobornyl(meth)acrylate;

Aminoethylacrylate, aminoethylmethacrylate, allylamine, N-methyliminoethylacrylate or tert. butylaminoethylmethacrylate;

N,N-Di(methoxymethyl)aminoethylacrylate or -methacrylate or N,N-Di(butoxymethyl)aminopropylacrylate or -methacrylate;

(Meth)acrylic acid amides such as (meth)acrylic acid amide, N-methylacrylic acid amide, N-methylol acrylic acid amide, N,N-dimethylolacrylic acid amide, N-methoxymethylacrylic acid amide, N,N-di(methoxymethyl) acrylic acid amide, N-ethoxymethylacrylic acid amide and/or N,N-di(ethoxyethyl)-(meth)acrylic acid amide;

Acryloyloxy- or methacryloyloxyethyl-, propyl- or butyl-carbamate or -allophanate; other example of suitable monomers containing carbamate groups are described in U.S. Pat. Nos. 3,479,328, 3,674,838, 4,126,747, 4,279,833 or 4,340,497;

Monomers containing epoxide groups such as the glycidyl ester of acrylic acid, methacrylic acid, ethacrylic acid, crotonic acid, maleic acid, fumaric acid or itaconic acid or allylglycidylether;

Ethylenically di- or multi-functional compounds, preferably diacrylates, triacrylates, and/or (meth)acrylic acid esters of polyfunctional alcohols, specifically allyl (meth)acrylate, hexane dioldi(meth)acrylate, ethylene glycol di(meth)acrylate, neopentyl glycol di(meth)acrylate, butane dioldi(meth)acrylate or trimethyl propane tri(meth)acrylate.

Preferably the monomer (iii) is selected from the group of the hydroxyl group-free acryl(meth)acrylic acid esters and styrene.

Preferably monomer (iv) is vinyl phosphonic acid.

Examples of aminoplast resins are described, for example in Römpp's *Encyclopedia of Paints & Printing Inks*, Georg Thieme Verlag, 1998, page 29, "Amino resins": the textbook *Paint Additives* by Johan Bieleman, Wiley-VCH, Weinheim, N.Y., 1998, pages 242 ff, the book *Paints, Coatings and Solvents*, $2^{nd}$ completely revised edition, edit. D. Stoye and W. Freitag, Wiley-VCH, Weinheim, N.Y., 1998, pages 80 ff, the patents U.S. Pat. No. 4,710,542 A or EP 0 245 700 A1 and in the article by B. Singh and colleagues "Carbamylmethylated Melamines, Novel Crosslinkers for the Coatings Industry," in Advanced Organic Coatings Science and Technology Series, 1991, vol. 13, pages 193 to 207.

The aminoplast resin is preferred, a melamine resin as marketed, for example, under the trade name Cymel® 327 by the Cytec Company.

In accordance with an additional, similarly preferred embodiment of the present invention, the monomer compound (D) used in the emulsion polymerization in step c) has at least one hydroxyl group.

An emulgator-free microgel of this type present in dispersion occurs in a core/shell structure. The inner zone in accordance with the definition previously given is completely crosslinked. The outer zone of this core/shell microgel is not crosslinked. Crosslinking of the outer shell when using a monomer compound with at least one radically polymerizable double bond does not take place until baking conditions exist for the production of corresponding multilayer coatings.

Partial crosslinking in the finished paint through the outer shell is only ensured when a monomer compound containing hydroxyl groups with at least one radically polymerizable double bond is used.

In accordance with this embodiment, the polymerized monomer mixture does not participate in the crosslinking to the microgel.

Furthermore, a coating composition containing this emulgator-free microgel dispersion demonstrates such outstanding adhesion that it can be used even in multilayer coatings considered critical in the production painting of automobiles, specifically in conjunction with powder clearcoats.

In the case of the previously described core/shell polymers or microgels, in accordance with a preferred embodiment the emulsion polymerization is carried out in the presence of an additional monomer compound (D) which contains at least one radically polymerizable double bond and no hydroxyl groups.

An emulgator-free microgel of this type present in dispersion occurs in a core/shell structure. The inner zone is completely crosslinked, in accordance with the description given previously. The outer zone of this core/shell microgel is similarly not crosslinked. In contrast to the core/shell polymer previously described, no crosslinking of the outer shell can take place under baking conditions for the production of corresponding multilayer coatings.

In accordance with this embodiment, it is ensured that the emulsion polymeride cannot participate in the crosslinking during film formation. Outstanding adhesion on plastic substrates or under powder clearcoats is thereby achieved.

In accordance with a similarly preferred embodiment of the present invention, the microgel has an acid number between 10 and 45 mg KOH/g, specifically between 10 and 30 mg KOH/g.

This ensures adequate stability of the dispersion in water.

From a methodological point of view, this polymerization does not exhibit any unusual features but takes place following the usual and known methods of radical emulsion polymerization in the presence of at least one polymerization initiator.

Examples of suitable polymerization initiators are initiators forming free radicals such as dialkyl peroxides, such as di-tertiary-butyl peroxide or dicumylperoxide; hydroperoxides such as cumolhydroperoxide or tertiary-butylhydroperoxide; peresters such tertiary butylperbenzoate, tertiary-butylperpivalate, tertiary-butylper-3,5,5-trimethyl-hexanoate or tertiary-butylper-2-ethylhexanoate; potassium, sodium or ammonium peroxodisulfate; azodinitriles such as azobisisobutyronitrile; c-c-splitting initiators such benzpinakolsilylether; or a combination of a non-oxidizing initiator with hydrogen peroxide. Water-insoluble initiators are preferably used. The initiators are preferably used in a volume of 0.1 to 25% by weight, especially preferred of 0.75 to 10% by weight, relative to the total weight of the monomers (a).

One possibility is the initiation of polymerization through a redox system. This process, well known in emulsion polymerization engineering, utilizes the fact that hydroperoxides are stimulated to radical decay at very low temperatures by suitable reduction agents.

Suitable reduction agents are, for example, sodium metabisulfite or its formaldehyde additive product (Na-hydroxymethanesulfinate). Isoascorbic acid is also highly suitable. The combination of tertiary-butylhydroperoxide, (iso) ascorbic acid and iron(II)sulfate is especially advantageous.

Using this mixture has the advantage that polymerization can be initiated at room temperature.

The corresponding monomers are polymerized in the solutions or the aqueous emulsions with the aid of the aforementioned radical-forming initiators at temperatures of 30 to 95° C., preferably 40 to 95° C., and when redox systems are used, at temperatures of 35 to 90° C. In operations under pressure, the emulsion polymerization can also be carried out at temperatures above 100° C.

The same applies to solution polymerization when higher-boiling organic solvents and/or pressure is used.

It is preferred that feed of the initiator is started some time, generally about 1 to 15 minutes, before the feed of the monomers. Further, a process is preferred in which addition of the initiator begins at the same time as addition of the monomers and ends about a half hour after the addition of the monomers has ended. The initiator is preferably added at a constant volume per unit of time. After the addition of the initiator is concluded, the reaction mixture is maintained at polymerization temperature long enough (generally 1 to 1½ hours) for all the monomers being used to have been essentially completely reacted. "Essentially completely reacted" is intended to signify that preferably 100% by weight of the monomers used have been reacted, but that it is still possible that a small residual monomer content, at most up to 0.5% by weight relative to the weight of the reaction mixture, can remain unreacted.

The customary and known stirrer vessels, stirrer vessel cascades, tube flow reactors, loop reactors or Taylor reactors, as described in patent DE 10 71 241 B1, patent applications EP 0 498 583 A1 or DE 198 28 742 A1 or in the article by K. Kataoka in *Chemical Engineering Science*, vol. 50, number 9, 1995, pages 1409 to 1416, can be considered as reactors for graft polymerization.

The previously described emulgator-free microgel dispersion is suitable under the invention for producing a multilayer coating, in particular in the automobile industry.

Quite especially preferred is the use of the emulgator-free microgel dispersion in the color-imparting coating composition, i.e. in a basecoat.

The best results with respect to rheological, mechanical and visual properties are achieved when the amount of microgel, relative to the solids in the coat obtained therefrom, is between 20 and 85%, preferably between 20 and 65%.

It is surprising that the emulgator-free microgel dispersions under the invention can be used in addition to the usual coating silicates in waterborne basecoat paints. In this case, the paint films originating therefrom do not exhibit inadequate condensation water resistance compared with basecoat paints without the addition of the inventive microgel dispersion.

For use in accordance with the invention, the multilayer coating can consist of three different layers, i.e. of 1) a first layers on the electrically conductive substrate consisting of an electrophoretically deposited coating agent;

2) a second, color-imparting layer, obtainable from a waterborne coating composition, which contains the emulgator-free microgel dispersion from the invention; and 3) a third clearcoat layer.

In the case of this multilayer coating of specifically only three different layers it must be stressed that the originating multilayer coating also has adequate stone chip resistance which can be attributed to the special properties of the waterborne basecoat paint containing the emulgator-free microgel of the present invention.

It is also possible that the multilayer coating consists of four different layers, i.e. of 1) a first layer on the electrically conductive substrate consisting of an electrophoretically deposited coating agent;

2) a second layer consisting of a primer or a filler;

3) a third, color-imparting layer, obtainable from a waterborne coating composition, which contains the emulgator-free microgel dispersion from the invention; and 4) a fourth clearcoat layer.

An advantage of this four-stage system is that the cured color-imparting layer has a further positive effect on the stone chip resistance properties of the primer-filler layer.

By using the emulgator-free microgel in accordance with the invention, a considerably higher film build—relative to conventional basecoat paints—can be achieved. The thickness of the cured coat from a coating composition containing the emulgator-free microgel dispersion in accordance with the invention may be between 15 and 55 µm.

The electrophoretically deposited coating agents are water-based coating compositions with a solids content of about 10 to 20% by weight, which normally carry binders, ionic groups or substitutes which can be reacted to ionic groups, and groups capable of chemical crosslinking, and contain in addition pigments and other normal additives.

Examples of such electrodeposition paints are described in DE 28 24 418 A1, DE 33 24 211 A1, EP 0 082 291, EP 0 178 531, EP 0 227 975, EP 0 234 395, EP 0 245 786, EP 0 261 385, EP 0 310 971, EP 0 333 327, EP 0 414 199, EP 0 456 270, EP 0 476 514, and U.S. Pat. No. 3,922,253.

The clearcoat layer, which in a multilayer coating for automobiles is located above the color-imparting basecoat layer, may be obtained by applying and baking a conventional solvent-borne or waterborne clearcoat composition, which is available as a single-component or two-component mixture and which contains one or more basic resins as the film-forming binder. To the extent that the binders are not self-crosslinking, the clearcoat composition may also contain cross-linkers. Polyester, polyurethane and/or poly(meth)acrylate resins, for example, can be used as the film-forming binders (base resins).

In addition to the chemically crosslinking binders and any necessary cross-linkers, these clearcoat paints may contain normal additives, such as catalysts, leveling agents and UV protective agents.

Examples of solvent-borne clearcoat compositions in single-component or two-component mixtures are described in DE 38 26 693 A1, DE 40 17 075 A1, DE 41 24 167 A1, DE 41 33 704A1, DE4204518A1, DE4204611 A1, EP0257513, EP0408858, EP0 523 267 A and EP 0 557 822.

Examples of waterborne clearcoat compounds in single-component or two-component form are described in DE 39 10 829 A1, DE 40 09 931 A1, DE 40 09 932 A1, DE 41 01 696 A1, DE 41 32 430A1, DE 41 34 290A1, DE 42 03 510A1, EP 0 365 098, EP 0 365, 775, EP 0 469 079 and EP 0 546 640, particularly in DE 44 19 216 A1 and DE 44 42 518 A1.

The clearcoat layer can also be produced from a powder paint or a powder clearcoat slurry. Reference is made to DE 42 22 194 A1, DE 42 27 580 A1, EP 0 509 392, EP 0 509 393, EP 0 522 648, EP 0 544 206, EP 0 555 705, EP 0 652 265, EP 0 666 779 and EP 0 714 958 with respect to the powder clearcoat or the powder clearcoat slurry.

It is also possible to react the microgel dispersion under the invention into a non-aqueous phase and to use it in solvent-borne coating compositions.

To obtain microgels in a non-aqueous phase, the water must be removed from the microgels in accordance with the invention present in an aqueous phase.

This can be done through any known process, for example, by spray drying, freeze drying or condensation, if necessary under reduced pressure.

After the water has been removed, the microgel of the invention may be present in powder form or as a resinous mass.

In accordance with a preferred variation, the microgel present in an aqueous phase can be reacted into a fluid, organic phase. This can be done by azeotropic distillation. One possible procedure is for the aqueous, emulgator-free microgel dispersion to be fed at increased temperature, if necessary at reduced pressure, continuously or discontinuously into a reactor which contains a retarder, i.e. a solvent or a mixture of several solvents of which at least one forms an azeotrope with water.

The reactor is equipped with a suitable condensation device and a water separator with a return to the reactor. After the azeotrope reaches boiling temperature, the gaseous azeotropic phase (i.e. retarder and water) rises in the condensation device. The azeotrope condenses there and runs into the water separator. A phase separation between the retarder and the water takes place in the separator. In continuous azeotropic distillation, the retarder returns to the reactor so that only small quantities of retarder have to be used. The water obtained from the separator is free of organic constituents and can be used again to produce the aqueous microgel dispersion in accordance with the invention.

The retarder can be selected from the group of xylol, butylacetate, methylisobutylketone, methylamylketone, pentanol, hexanol or ethylhexanol.

A considerable advantage in this process is that after the retarder has been reacted to the organic phase, it remains there and is beneficial for the use of solvent-borne coating compositions. With respect to the further use of these microgels present in an organic phase for the production of solvent-containing coating compositions, the retarders mentioned are suitable solvents.

Because the retarder is recycled and water simultaneously accumulates with no additional process steps, this process is remarkable for its extraordinary degree of environmental compatibility, since no byproducts requiring disposal are created. Said byproducts accumulate in large quantities with comparable known production processes.

A special form of azeotropic distillation is carried out in such a way that the aqueous, emulgator-free microgel dispersion is added to a mixture of a retarder and a high-boiling organic solvent. This high-boiling, organic solvent prevents the microgels from being baked onto the wall of the reactor during reaction to the organic phase.

The high-boiling solvent can be selected from the group of glycol esters, such as butyl glycol acetate and/or butyl diglycol acetate.

As in the case of the retarder, the high-boiling solvent is also a normal component in a coating composition containing solvents.

The microgel obtainable in this way can be used in particular for coating compositions containing solvents.

DETAILED DESCRIPTION OF THE PREFERRED EMBODIMENTS

A preferred application of the invention is its use in basecoat paints containing solvents, in particular effect basecoats and clearcoats for the topcoating or finishing of automobiles. This microgel present in an aqueous phase similarly endows these solvent-containing coating compositions with excellent application characteristics and outstanding decorative properties which are exhibited, for example, in a distinctive metallic effect, very good resistance to sagging on vertical surfaces (SCA—sagging control agent), freedom from clouding, resistance to resoftening from the clearcoat, good filling of sanding marks and satisfaction of the standard automobile industry requirements for paint properties.

The microgels can be used equally well for the production of solvent-containing clearcoats, coil coating compositions and bakeable paints for industrial applications and house paints for the construction sector.

A further unique feature of this microgel is found in its high resistance to shear. This property allows such microgels to be used for the first time in the production of pigment preparations, in particular as mulling agents for tinting pastes. The advance here is that the tinting pastes produced in this way have a high pigment content and low viscosity at the same time.

EXAMPLES

Producing the Initial Products

Acrylate Dispersion 1:

305 g of butyl glycol is weighed in a 2-liter reaction vessel with a stirrer and a feed vessel and heated to 120° C. At 120° C., a mixture of 40 g of styrene, 53.3 g of butylmethacrylate, 462.3 g of laurylacrylate, 152.4 g of 2-hydroxyethylacrylate, 6.5 g vinyl phosphonic acid, 41.6 g of acrylic acid and 15,1 g of tertiary-butylper-2-ethylhexanoate is dosed at an even rate from the feed vessel in the space of 2 hours. After the feed is completed, it is repolymerized for 0.5 hour. Then a mixture of 7.2 g butyl glycol and 1.5 g of tertiary-butylper-2-ethyl-hexanoate is added in the space of 0.1 hour. After the feed is completed, it is repolymerized for 1.5 hours.

Then a mixture of 14.3 g dimethylethanolamine and 970 g of deionized water is added. A stable dispersion with a solids content of 36% is obtained (30 minutes at 180° C.).

Acrylate Dispersion 2:

300 g of butyl glycol is weighed in a 2-liter reaction vessel with a stirrer and a feed vessel and heated to 120° C. At 120° C., a mixture of 146.4 g of 2-ethylhexacrylate, 120 g of styrene, 160 g of butyl methacrylate, 255.2 g of polypropylene glycol monomethacrylate with a number-average molecular weight of 350, 105 g of 4-hydroxybutylacrylate, 7.2 g of vinyl phosphonic acid, 46.2 g of acrylic acid and 23.2 g of tertiary-butylper-2-ethylhexanoate is evenly dosed from the feed vessel in the space of 3 hours. After the feed is completed, it is repolymerized for 0.5 hour. Then a mixture of 7.2 g butyl glycol and 1.5 g of tertiary-butylper-2-ethylhexanoate is added in the space of 0.1 hour. After the feed is completed, it is repolymerized for 1.5 hours.

Then a mixture of 18.7 g of dimethylethanolamine and 850 g of deionized water is added. A stable dispersion with a solids content of 41% is obtained (30 minutes at 180° C.).

Acrylate Dispersion 3:

300 g of butyl glycol is weighed in a 2-liter reaction vessel with a stirrer and a feed vessel and heated to 100° C. At 100° C., a mixture of 576.6 g 2-ethylhexyl acrylate, 210 g of 4-hydroxybutyl acrylate, 7.2 g of vinyl phosphonic acid and 46.2 g of acrylic acid is evenly dosed from the feed vessel in the space of 3 hours. A mixture of 25.2 g tert.-butylper-2-ethylhexanoate and 48 g of butyl glycol is added from a second feed vessel in the space of 3.5 hours. Both feeds are started simultaneously. After the second feed is completed, it is repolymerized for 2 hours.

Then 18.1 g of dimethylethanolamine and 800 g of deionized water is added. A stable dispersion with a solids content of 41% is obtained (30 minutes at 180° C.).

Acrylate Dispersion 4:

305 g of butyl glycol are weighed in a 2-liter reaction vessel with a stirrer and a feed vessel and heated to 100° C. At 100° C., 10 percent by weight of a mixture of 257.8 butyl acrylate, 54 g of styrene, 72 g of butyl methacrylate, 229.7 g of polypropylene glycol monomethacrylate with a number-average molecular weight of 350, 94 g of 4-hydroxy butyl acrylate, 6.5 g of vinyl phosphonic acid, 41.6 g of acrylic acid and 15.1 g of tertiary-butylper-2-ethylhexanoate is added from a feed vessel. After 20 minutes the remaining 90 percent by weight of the mixture is dosed evenly in the space of 3 hours. After the feed is completed, it is repolymerized for 0.5 hour. Then a mixture of 7.2 g butyl glycol and 0.8 g of tertiary-butylper-2-ethylhexoanate is dosed in the space of 0.1 hour. After this feed is completed, it is repolymerized for 2 hours.

Then a mixture of 15.4 g of dimethylethanolamine and 1590 of deionized water is added. A stable dispersion with a solids content of 28% is obtained (30 minutes at 180° C.).

Acrylate Dispersion 5 (for Application Example):

200 g of butyl glycol is weighed in a 4-liter reaction vessel with a stirrer and a feed vessel and heated to 120° C. At 120° C., a mixture of 285 g of methylmethacrylate, 140 g of 2-ethylhexylacrylate, 60 g of 2-hydroxypropylmethacrylate, 15 g of methylacrylic acid and 10 g tertiary-butylper-2-ethylhexanoate is evenly dosed in the space of 3 hours. After the feed is completed, it is repolymerized for 0.5 hour. Then a mixture of 10 g butyl glycol and 1 g of tertiary-butylper-2-ethylhexanoate is dosed in the space of 0.1 hour. After this feed is completed, it is repolymerized for 1.5 hours.

Then 15.5 g of dimethylethanolamine and 1630 g of deionized water are added. A stable dispersion with a solids content of 22% is obtained (30 minutes at 180° C.).

Polyurethane Dispersion 1:

602.3 g of a polyester with a number-average molecular weight of 1440 on a dimerized sebaceous acid base (Pripol® 1013 from Unichema) and 1.6-hexanediole with an acid number below 3, 56 g dimethylpripione acid, 306.2 g tetramethylxylylenediisocyanate, 241 g methylethylketone and 0.9 g dibutylinndilaurate are weighed in a 6-liter reaction vessel with return condenser. This mixture is maintained at 80° C. until the isocyanate content amounts to 2.35%. Then 90.4 g trimethylolpropane and 23 g methylethylketone are added and pushed to an isocyanate content of <0.03% at 80° C. Then a mixture of 33.5 g dimethylethanolamine and 1085 g deionized water and afterward 1598 g deionized water are added. Following vacuum distillation, in which the methylethylketone is removed, a dispersion with a solids content of 28% is obtained (60 minutes at 120° C.).

Polyurethane Dispersion 2 (for Application Example):

249.4 g of a polyester with a number-average molecular weight of 2100 on a 1.6-hexanediole and isophthalic acid base, 15.9 g dimethylolpropionic acid, 86.9 g tetramethylxylylenediisocyanate, 0.2 g dibutyltindilaurate and 117.2 g methylethylketone are weighed in a 4-liter reaction vessel with a return condenser and heated to 85° C. This mixture is maintained at 85° C. until the isocyanate content reads 1.95%. Then 76.8 g of a di-trimethylolpropane monolaurin acid ester is added and pushed to an isocyanate content of <0.02% at 85° C. Then a mixture of 10.7 g dimethylethanolamine and 1080 g of deionized water is added. Following vacuum distillation, in which the methylethylketone is removed, a dispersion with a solids content of 29% is obtained (60 minutes at 120° C.).

Polyester Dispersion 1 (for Application Example):

332.8 g of neopentyl glycol, 283.2 g of hexane diole, 696 g of a dimerized fatty acid (Pripol® 1013 from Unichema) and 184.2 g of hexahydrophthal acid anhydride is weighed in a 4-liter reaction vessel with stirrer and packed column and heated so that column head temperature does not exceed 100° C. Maximum esterization temperature is 230° C. At an acid number below 10, it is cooled. At 150° C., 307.2 g of trimellitic acid anhydride is added and heated so that the column head temperature does not exceed 100° C. Maximum esterization temperature is 180° C. At an acid number of 30, it is cooled. A polyester with a calculated molecular weight of 1870 and a hydroxyl number of 83 is obtained.

At a temperature below 100° C., a mixture of 42.7 g dimethylethanolamine and 1380 g deionized water is dosed in a controlled manner and afterward 1910 g of deionized water is added. A stable dispersion with a solids content of 30% is obtained (60 minutes at 120° C.).

Production of the Microgel Dispersions Under the Invention

Microgel Dispersion 1:

834.7 g of acrylate dispersion 1 is weighed in a 2-liter reaction vessel and while stirring 139.9 g of a standard melamine resin (Cymel® from Dyno Cytec), 1 g of dimethylethanolamine and 580 g of deionized water are added in succession to the initial mixture. It is heated to 95° C. and condensed for 7 hours at 95° C., following which it is cooled and 14 g of dimethylethanolamine is added to the initial mixture.

A stable dispersion with a solids content of 24% is obtained (30 minutes at 180° C.). A sample of this dispersion reduced with tetrahydrofuran exhibits severe turbidity.

Microgel Dispersion 2:

830.7 g of acrylate dispersion 2 is weighed in a 2-liter reaction vessel and while stirring 162.3 g of a standard melamine resin (Cymel® from Dyno Cytec) and 800 g of deionized water are added in succession to the initial mixture. It is heated to 94° C. and condensed for 10 hours at 94° C., following which it is cooled and 11.9 g of dimethylethanolamine is added to the initial mixture. A stable dispersion with a solids content of 24% is obtained (30 minutes at 180° C.). A sample of this dispersion reduced with tetrahydrofuran exhibits severe turbidity.

Microgel Dispersion 3:

830.7 g of acrylate dispersion 3 is weighed in a 4-liter reaction vessel with a return condenser and while stirring 162.3 g of a standard melamine resin (Cymel® from Dyno Cytec), and 800 g of deionized water are added in succession to the initial mixture. This mixture is heated to 94° C. and maintained at 94° C. for 10 hours. Then 11.7 g of dimethylethanolamine is added to the initial mixture. Afterward a mixture of 15.9 g styrene, 23.7 g of butylmethacrylate, 14.5 g of 4-hydroxybutylacrylate and 1.9 g of tertiary-butylper-2-ethylhexanoate is added at 90° C. After one hour at 90° C., a mixture of 0.4 g tertiary-butylper-2-ethylhexanoate and 2 g of butyl glycol is added, heated to 95° C. and repolymerized for 2 hours at 95° C. After cooling and the addition of 330 g of deionized water, a stable dispersion with a solids content of 22% is obtained (30 minutes at 180° C.). A sample of this dispersion reduced with tetrahydrofuran exhibits severe turbidity.

Microgel Dispersion 4:

847.9 g of acrylate dispersion 4 is weighed in a 2-liter reaction vessel with return condenser and while stirring 115 g of a standard melamine resin (Cymel® 327 from Dyno Cytec) and 400 g of deionized water are added in succession to the initial mixture. This mixture is heated to 97° C. and maintained at 97° C. for 9 hours. After cooling and the addition of 7.7 g of dimethylethanolamine, a stable dispersion with a solids content of 22% is obtained (30 minutes at 180° C.). A sample of this dispersion reduced with tetrahydrofuran exhibits severe turbidity.

Microgel Dispersion 5:

194 g of deionized water and 200 g of microgel dispersion 4 are weighed in a 2-liter reaction vessel with return condenser and while stirring heated to 82° C. At 82° C., a mixture of 30 g of methylmethacrylate, 46.4 g of laurylacrylate, 2.4 g of acrylamide, 1.6 g of 2.2'-azo-bis-isobutyronitrile (AIBN), 350 g of microgel dispersion 4 and 55 g of deionized water is added and repolymerized for 3 hours at 82° C. After cooling and the addition of 0.7 g of dimethylethanolamine, a stable dispersion with a solids content of 23% is obtained (30 minutes at 180° C.). A sample of this dispersion reduced with tetrahydrofuran exhibits severe turbidity.

Use of the Microgel Dispersions Under the Invention

Application Example 1

To produce a metallic water-based paint, 107.1 g of polyurethane dispersion 1 and 312.5 g of the microgel dispersion 1 under the invention, a mixture of 50 g polyester dispersion 1, 0.4 g of dimethylethanolamine and 35 g of deionized water, 16.6 g of a standard melamine resin (Cymel® 327 from Dyno Cytec), 42.9 g of a standard aluminum bronze, previously stirred to a paste in 56.2 g of butyl glycol and 31.6 g of n-Butanol and a mixture of 20.2 g of a standard acrylate thickener (Latekoll® D from BASF) and 46 g of deionized water are processed into a paint. The pH value is adjusted to 8.00 to 8.30 with dimethylethanolamine and to a viscosity of 100 mPa·s with deionized water (measured at 1,000 s$^{-1}$).

Application Example 2

The same procedure is followed as in example 1. However, the 312.5 g of microgel dispersion 1 is replaced by 312.5 g of microgel dispersion 2 under the invention.

Visual Check:

The aqueous basecoats produced in accordance with the examples 1 and 2 described previously are applied by spraying onto a 70×70 cm metal plate in a climate-controlled spray booth so that a dry coating thickness of 15-18 μm is obtained. After flashing for 5 minutes, each of the painted substrates receives a standard automobile production clearcoat with a dry coating thickness of 40-45 μm and the coatings are then baked for 30 minutes at 140° C.

Through the use of the microgel dispersions under the invention, finishes are obtained which are remarkable for their very good aluminum flake orientation, a substantially reduced tendency to clouding and an outstanding topcoat condition.

Application Example 3

To produce a metallic water-based paint, 93.1 g of polyurethane dispersion 2, 245.5 g of microgel dispersion 3 under the invention, 165.5 g of acrylate dispersion 5, 19.4 g of a standard melamine resin (Cymel® 327 from Dyno Cytec), 42.9 g of a standard aluminum bronze, previously stirred to a paste in 56.2 g of butyl glycol and 31.6 g of n-Butanol and a mixture of 19.8 g of a standard acrylate thickener (Latekoll® D from BASF) and 50 g of deionized water are processed into a paint. The pH value is adjusted to between 8.00 and 8.30 with dimethylethanolamine and deionized water is used to adjust the viscosity to 100 mPa·s (measured at 1,000 s$^{-1}$).

Application Example 4

The same procedure is following as in example 3. However, the 245.5 g of microgel dispersion 3 is replaced by 234.8 g of microgel dispersion 5 under the invention.

Comparison Example 1

The same procedure is followed as in example 3. However, the 245.5 g of microgel dispersion 3 is replaced by 216 g of a microgel dispersion produced from example 9 in DE 39 40 316.

Steam Jet Test:

Each of the aqueous basecoats produced in accordance with examples 3 and 4 described previously and the comparison example 1 is applied with a spray gun on a 5×10 cm coated polycarbonate substrate in a climate-controlled spray booth so that a dry coating thickness of 15-18 μm is obtained. After intermediate drying of 10 minutes at 80° C., the painted substrates receive a standard automobile industry 2K clearcoat for plastics finishing with a dry coating thickness of 40-45 μm and the coats are then baked for 45 minutes at 80° C. An X-shaped cross about 10 cm in length with legs intersecting at about 30° is incised on these coated test specimens following Sikkens, using an Erichsen 463 scratch stylus with a 1-mm cutting tip.

The test specimen and the steam jet nozzle are anchored so that the center of the jet is located over the cross, the steam jet is parallel to one of the cuts, the distance of the steam jet nozzle is 10 cm from the test specimen, and the contact angle is 90°.

The test specimen is sprayed with water at 60° C. flowing at 11-11.5 l/min in a trapezoidal jet pattern for 60 seconds.

The analysis is made by visual evaluation:

No chipping or creep up to a 1 mm maximum is O.K.

Creep of>1 mm up to chipping over large areas is not O.K.

The individual results can be read from the following table:

TABLE I

| Paint samples | Adhesion | Chipping after steam jet test |
|---|---|---|
| Sample 1 | Gt 0 | 1 mm |
| Sample 2 | Gt 0 | 0 mm |
| Sample 3 | Gt 0 | 0 mm |
| Sample 4 | Gt 0 | 0 mm |
| Comparative sample 1 | Gt 3 | 9 mm |

Table I shows clearly that, through the use of the microgel dispersions under the invention, finishes are obtained which excel due to good adhesion to polycarbonate. The examples under the invention show further very good aluminum flake orientation and stability as well as outstanding topcoat holdout.

The invention claimed is:

1. Emulgator-free microgel dispersed in an aqueous phase, obtainable by
   a) producing a polyacrylate (A) in the presence of at least one compound (B) containing a phosphonic acid group, where the polyacrylate (A) has at least one hydroxyl group and at least one carboxyl group;
   b) aqueous phase crosslinking of the reaction mixture originating from step a) with an aminoplast resin (C); and
   c) subsequent emulsion polymerization of the reaction mixture originating from step b) with at least one monomer composition (D) which contains at least one radically polymerizable double bond.

2. Microgel of claim 1, wherein the aminoplast resin is a melamine resin.

3. Microgel of claim 1, wherein it has an acid number between 10 and 45 mg KOH/g.

4. Microgel of claim 1, wherein the polyacrylate (A) is obtainable by polymerization of a monomer (i) with at least one polymerizable double bond and at least one hydroxyl group;
   a monomer (ii) with at least one polymerizable double bond and at least one carboxyl group; and
   a monomer (iii) without a hydroxyl group and without a carboxyl group with at least one polymerizable double bond.

5. Microgel of claim 1, wherein copolymerization is carried out in the presence of an additional monomer (iii) without a hydroxyl group and without a carboxyl group, containing at least one polymerizable double bond.

6. Microgel of claim 4, wherein the monomer (i) is selected from the group of hydroxyethyl(meth)acrylate, hydroxypropyl(meth)acrylate, hydroxybutyl(meth)acrylate and ε-caprolactame estered on a hydroxy(meth)acrylate base.

7. Microgel of claim 4, wherein the monomer (ii) is selected from the group of acrylic acid and methylacrylic acid.

8. Microgel of claim 4, wherein the monomer (iii) is selected from the group of hydroxyl group-free acryl(meth) acrylic acid esters and styrene.

9. Microgel of claim 1, wherein at least one monomer compound (D) has at least one hydroxyl group.

10. Microgel of claim 1, wherein emulsion polymerization is carried out in the presence of an additional monomer compound (D), which contains at least one radically polymerizable double bond and no hydroxyl groups.

11. A multilayer coating, comprising an emulgator-free microgel of claim 1.

12. The multilayer coating of claim 11, wherein the multilayer coating contains a basecoat.

13. The multilayer coating of claim 11, wherein the percentage of the microgel, relative to the solids of the coat containing the microgel, is between 20 and 85%.

14. Emulgator-free microgel dispersed in an aqueous phase, obtainable by
   a) production of a polyacrylate (E) by copolymerization of a monomer (i) with at least one polymerizable double bond and at least one hydroxyl group;
   a monomer (ii) with at least one polymerizable double bond and at least one carboxyl group; and
   a monomer (iv) with at least one polymerizable double bond and with at least one phosphonic acid group;
   b) aqueous phase crosslinking of the reaction mixture originating from step a) with an aminoplast resin (C); and
   c) subsequent emulsion polymerization of the reaction mixture originating from step b) with at least one monomer compound (D) which contains at least one radically polymerizable double bond.

15. Microgel of claim 14, wherein the monomer (iv) is vinyl phosphonic acid.

* * * * *